(12) United States Patent
Huang et al.

(10) Patent No.: US 9,048,685 B2
(45) Date of Patent: Jun. 2, 2015

(54) EMERGENCY LIGHTING WITH CHARGING INDICATOR CIRCUITRY

(76) Inventors: Alex Huang, Heshan (CN); Qiusheng Chen, Heshan (CN)

(\*) Notice: Subject to any disclaimer, the term of this patent is extended or adjusted under 35 U.S.C. 154(b) by 674 days.

(21) Appl. No.: 13/355,044

(22) Filed: Jan. 20, 2012

(65) Prior Publication Data
US 2013/0187470 A1 Jul. 25, 2013

(51) Int. Cl.
*H02J 9/00* (2006.01)
*H02J 9/06* (2006.01)
*H05B 33/08* (2006.01)

(52) U.S. Cl.
CPC ............ *H02J 9/065* (2013.01); *H05B 33/0812* (2013.01); *H05B 33/0842* (2013.01); *Y02B 20/343* (2013.01)

(58) Field of Classification Search
CPC . H02J 9/065; H05B 33/0812; H05B 33/0842; Y02B 20/343
USPC .................................. 307/66; 315/86, 87, 160
See application file for complete search history.

(56) References Cited

U.S. PATENT DOCUMENTS

| | | | | |
|---|---|---|---|---|
| 3,506,787 A | * | 4/1970 | Golonski | 381/9 |
| 5,646,486 A | * | 7/1997 | Edwards et al. | 315/86 |
| 5,655,830 A | * | 8/1997 | Ruskouski | 362/240 |
| 5,739,639 A | * | 4/1998 | Johnson | 315/86 |
| 6,142,648 A | * | 11/2000 | Logan et al. | 362/234 |
| 7,690,802 B2 | * | 4/2010 | Higley et al. | 362/20 |
| 8,002,445 B2 | * | 8/2011 | Tachino et al. | 362/343 |
| 8,072,318 B2 | * | 12/2011 | Lynam et al. | 340/438 |
| 8,182,123 B2 | * | 5/2012 | Vogel et al. | 362/471 |
| 2007/0211466 A1 | * | 9/2007 | Pan | 362/252 |
| 2009/0026961 A1 | * | 1/2009 | Lin | 315/86 |
| 2010/0109438 A1 | * | 5/2010 | Scoggins et al. | 307/66 |
| 2010/0237840 A1 | * | 9/2010 | Walter et al. | 323/282 |
| 2011/0006691 A1 | * | 1/2011 | Blaha et al. | 315/185 R |
| 2011/0163672 A1 | * | 7/2011 | Shew et al. | 315/86 |
| 2012/0104858 A1 | * | 5/2012 | Noe | 307/66 |
| 2013/0328402 A1 | * | 12/2013 | Noguchi | 307/66 |

* cited by examiner

*Primary Examiner* — Rexford Barnie
*Assistant Examiner* — Elim Ortiz
(74) *Attorney, Agent, or Firm* — Houston & Associates, LLP

(57) ABSTRACT

Emergency lighting with a charging indicator circuitry comprises a power source module, a lighting circuit, a battery circuit, and an emergency switch circuit. The battery circuit includes charging indicator circuitry and a battery module; the power source module is connected with the battery module via the charging indicator circuitry. When the utility power is interrupted or a test switch is pressed, the light of the charging indicator circuitry goes out to indicate that the emergency lighting is in discharging status. When the utility power is supplied normally, if a battery within the battery module is in disconnected state, the light of the indicating circuitry goes out to indicate that the emergency lighting is in disconnected state. The charging indicator circuitry may be a simple light-emitting indicating circuit, has no need for much modification to the original circuit during manufacture and design, and may be simple and quickly-responsive.

9 Claims, 4 Drawing Sheets

EMERGENCY LIGHTING WITH CHARGING INDICATOR CIRCUITRY

SUMMARY OF THE INVENTION

The present invention relates to an emergency lighting, and more particularly, to an emergency lighting with a charging indicator circuitry.

For emergency lighting on the current market, most products have only one LED indicator which is used only to indicate whether commercial power is supplied or not, and the LED indicator is still "ON" after the test switch is pressed or the battery is disconnected. The LED indicator cannot indicate the charging status of the battery and cannot play the role of a charging indicator. Although some products have the function of charging indication, their circuitry is complicated and a comparator or a complicated IC-chip is needed to complete the action of charging indication. As a result, the difficulty in the research and development is greatly increased, the productivity is reduced, and the cost is raised.

In order to solve the above-mentioned problems, it is an object of the present invention to provide emergency lighting with a charging indicator circuitry which has a simple, practical circuit and can correctly indicate the charging status of the battery.

The technical solution of the present invention applied for solving above problems is:

An emergency lighting with a charging indicator circuitry includes a power source module, a lighting circuit, a battery circuit, and an emergency switch circuit, wherein the battery circuit includes a charging indicator circuitry for indicating the charging status of the battery, and a battery module for storing the electric energy and discharging the electric power when needed; the power source module is connected with the battery module via the charging indicator circuitry, the power supply terminal of the battery module is connected with the lighting circuit, and the power source module is connected with the lighting circuit via the emergency switch circuit.

Further, the charging indicator circuitry includes a light-emitting indicator unit, and a voltage-drop circuit which lets the light-emitting indicator unit emit light normally; the light-emitting indicator unit is connected in parallel with the voltage-drop circuit, and is connected with the power source module and the battery module. The light-emitting indicator unit is used for indicating the charging status, and may be lighted to indicate when the current flows through it; wherein the voltage-drop circuit is used for stabilizing the current in the charging circuit and also used for protecting the light-emitting indicator unit from being burned by high voltage and so displaying wrong information.

Further, the light-emitting indicator unit is a light-emitting diode, the positive electrode of the light-emitting diode is connected with the power source module, and the negative electrode of the light-emitting diode is connected with the battery module. It is the easiest optical signal indicating method to adopt a light-emitting diode in the light-emitting unit. By this method, the production costs can be extremely reduced, and the light-emitting diode consumes less power, has small size, can been installed easily, and is suitable for long-term use of the emergency lighting.

Further, the forward voltage of the light-emitting diode is 1.8 Volts.

Further, the voltage-drop circuit includes a first diode, a second diode, and a voltage-drop resistor; the positive electrode of the first diode is connected with the power source module and the light-emitting indicator unit, the positive electrode of the second diode is connected with the negative electrode of the first diode, and the negative electrode of the second diode is connected with the positive electrode of the battery module via the voltage-drop resistor. The voltage-drop circuit adopts the diodes and the voltage-drop resistor. By this way, the simplest voltage-drop circuit is constructed. Therefore, not only the cost can be reduced effectively, but also it has good operability and safety, consumes not much electric energy, and lets the design of the whole circuitry be suitable for environment protection and can be installed easily.

Further, the forward voltage of both the first diode and the second diode is 0.7 Volts. The total sum of the forward voltage of the two diodes is 1.4 Volts, which has a voltage difference to 1.8 volts of the light-emitting diode. The voltage difference is between the two terminals of the voltage-drop resistor, so that the battery module may maintain an appropriate charging current by simply adjusting the value of the voltage-drop resistor.

Further, the lighting circuit includes a plurality of light-emitting units connected in parallel with each other; the positive electrode of the light-emitting unit is connected with the positive electrode of the battery module, and the negative electrode of the light-emitting unit is connected with the emergency switch circuit. The plurality of light-emitting units connected in parallel are used for illumination when the utility power is interrupted, and when the utility power is interrupted, the light-emitting unit is lighted by the electric power provided by the battery module; since the positive electrode of the light-emitting unit is connected with the charging loop of the battery module, when the battery module is in charging, there are still some voltage on the positive electrode of the light-emitting unit, which can light the light-emitting unit. That is the reason why a normal charging circuit needs a comparator instead of being connected in series with the battery module directly. When the battery is disconnected, the charging indicator circuitry can still be lighted by the light-emitting unit, so that it cannot indicate the charging status of the battery correctly. In order to solve the problem, the power source module is connected with the negative electrode of the light-emitting unit via the intelligent emergency switch and provides a voltage which is same with or higher than the positive electrode to the negative electrode of the light-emitting unit. The light-emitting unit will not be conductive and lighted, so that the charging indicator circuitry can perform normally in different conditions.

Further, the emergency switch circuit is connected with the ground, the power source module, and the negative electrode of the light-emitting unit respectively. The intelligent emergency switch is connected with the ground and the power source module. When the utility power is supplied normally, the intelligent emergency switch outputs voltage to the negative electrode of the light-emitting unit; when the utility power is interrupted or the test switch is pressed, the intelligent emergency circuit connects the negative electrode of the light-emitting unit and the electric wires, the electric energy of the battery module is led to the ground through the light-emitting unit and the intelligent emergency switch, thus the light-emitting unit is lighted. By means of the way for controlling, lighting and extinguishing the light-emitting unit, not only a simpler design for the whole circuit can be obtained, but also any complex IC module is not needed, the cost is further reduced, the production is sped up, and the economic efficiency is raised.

Further, the power source module includes a rectifier module for rectifying the utility power, and a voltage-stabilizing module for stabilizing the output voltage. The current and voltage of the battery module should be controlled properly so as to prevent the failures of the battery module due to a large current. In order to maintain the safety of the charging indicator circuitry and the battery module, the charging indicator circuitry is provided with the voltage-drop circuit, as well as the voltage at the joint point of the battery module and the power source module should be relatively stable, thus the voltage may be stabilized within a range suitable for charging by the rectifier module and the voltage-stabilizing module within the power source module, thereby providing a more effective protection for the charging indicator circuitry and the battery module.

Furthermore, the power source module includes a switch test circuit for simulating the interruption of the utility power; the switch test circuit is connected with the power supply output of the power source module and the ground. The switch test circuit is connected with the voltage output point of the voltage-stabilizing module within the power source module and the ground respectively. When the test switch is pressed, the voltage output point of the voltage-stabilizing module is connected with the ground, thereby the power supply to the emergency switch circuit and the battery circuit is interrupted; In this way, the circuitry condition in the case of the interrupted utility power can be simulated in order to test if the emergency lighting can operate normally. Although the power source of the emergency lighting is generally hidden behind a wall surface or is disposed in a relatively remote place, the functions of the emergency lighting can be tested conveniently by providing the switch test circuit. Additionally, the elements of the charging indicator circuitry can be examined for their appropriateness. In this way, the tests are running by means of connecting the output of the voltage-stabilizing module to the ground. Comparing to normal switch test circuit, due to above-said design, the durability of the rectifier module and the voltage-stabilizing module can be preserved. In other words, the interruption of the switch will not make the voltage of the rectifier module and the voltage-stabilizing module increase rapidly and the elements burned thereby. This design has advantage of convenient, effective, and quickly-responsive.

Preferably, the switch test circuit includes a triode, a switch button, and a high-value resistor, in which the emitting electrode of the triode is connected with the voltage-stabilizing output of the power source module and the switch button, the other terminal of the switch button is connected with the base electrode of the triode and the high-value resistor, and one terminal of the high resistor is connected with the ground.

The beneficial effects of the present invention:

An emergency lighting with a charging indicator circuitry according to the present invention, comprising a power source module, a lighting circuit, a battery circuit, and an emergency switch circuit; the battery circuit includes a charging indicator circuitry and a battery module; the power source module is connected with the battery module via the charging indicator circuitry, the power supply terminal of the battery module is connected with the lighting circuit, and the power source module is connected with the lighting circuit via the emergency switch circuit. The power source module is connected with the battery module via the charging indicator circuitry. Since the charging indicator circuitry is connected in series with the battery module, when the electric power is supplied normally, the charging indicator circuitry indicates that it is in charging; and when the utility power is interrupted or the test switch is pressed, the indication light of the charging indicator circuitry goes out to indicate that the emergency lighting is in discharging status, and in the case of that the utility power is supplied normally, if the battery within the battery module is in a disconnected status, since the charging indicator circuitry is connected in series with the battery module, the indication light of the indicating circuitry is distinguished to indicate the emergency lighting is in a disconnected status. The charging indicator circuitry may be a simple lighting indicating circuitry, and there is no need for much improvement on the original circuit during manufacture and design, so that the charging indication function of the emergency lighting may be completed simply and quickly, and with only fewer components. Not only the functions of the emergency lighting are increased but also the production costs are decreased and the economic efficiency is improved.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
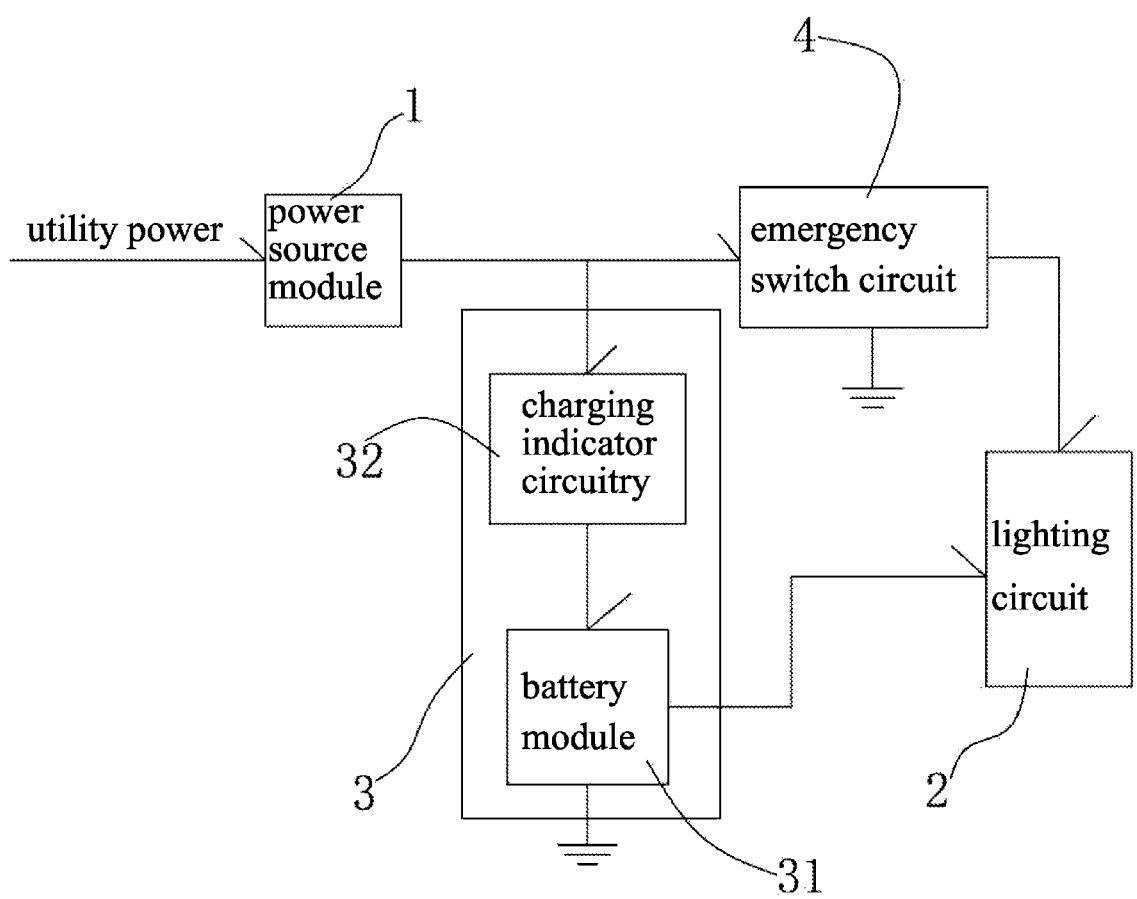
FIG. 1 is a module block diagram of an emergency lighting with a charging indicator circuitry of the present invention.
Figure 2:
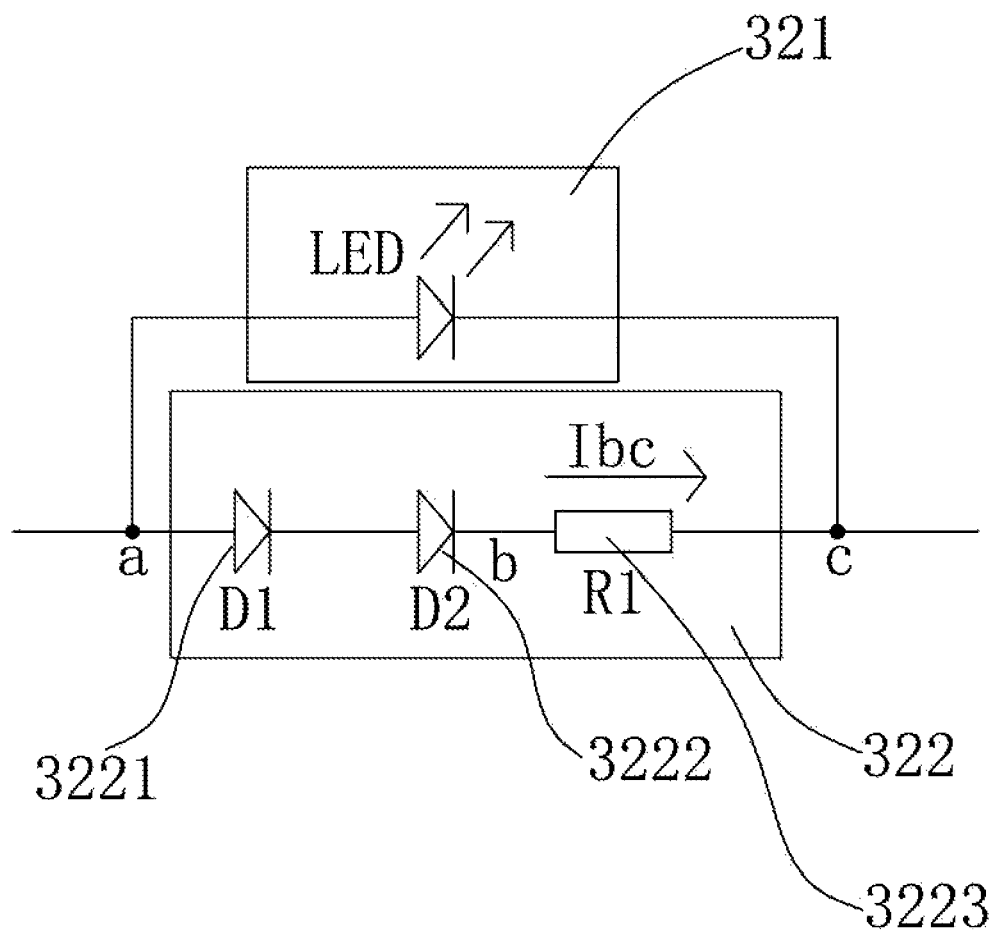
FIG. 2 is a schematic diagram of a charging indicator circuitry of the emergency lighting with a charging indicator circuitry according to the invention.
Figure 3:
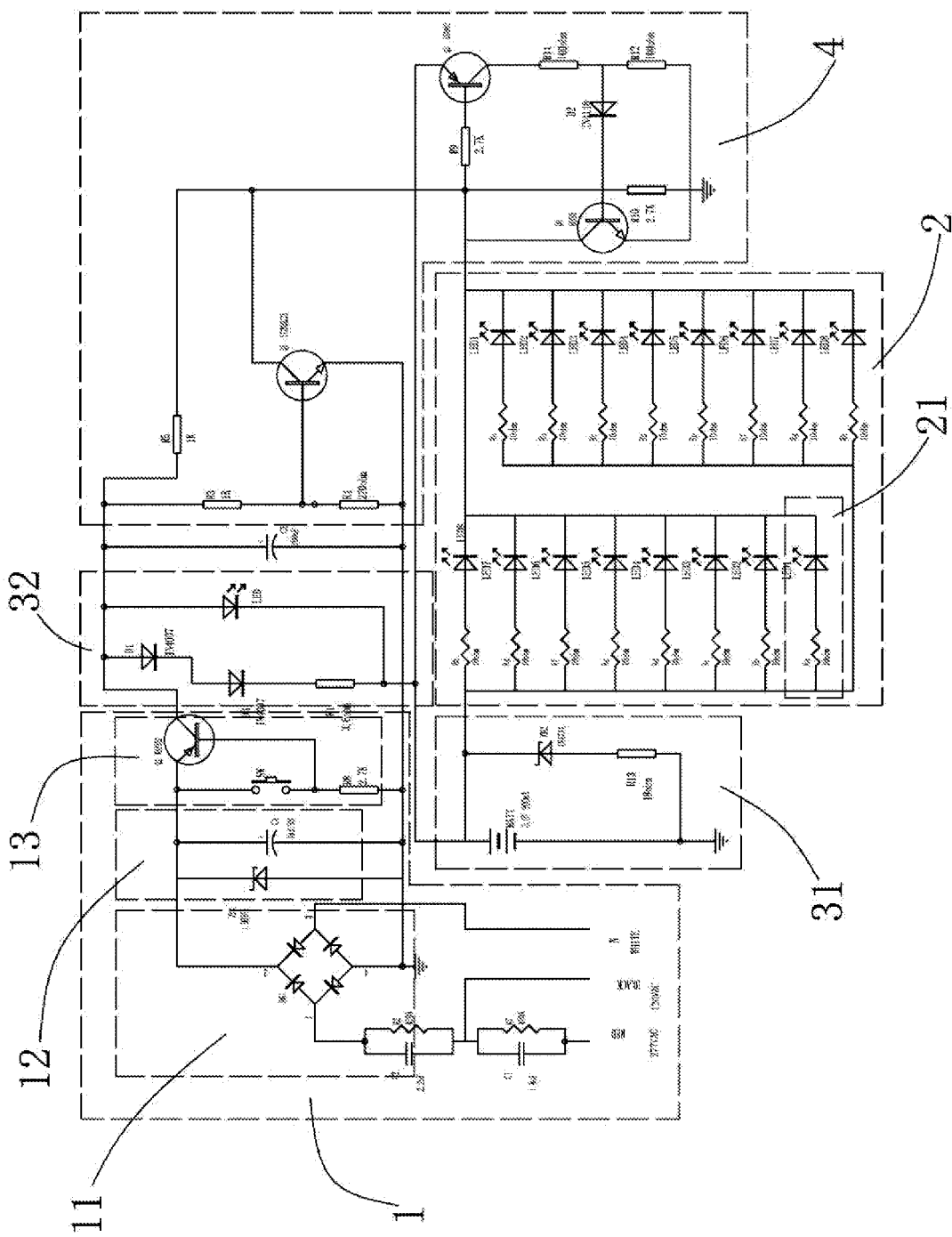
FIG. 3 is a schematic circuit diagram of the emergency lighting with a charging indicator circuitry according to the first embodiment of the invention.

Referring to FIG. 1 to FIG. 3, an emergency lighting with a charging indicator circuitry according to an embodiment of the invention includes a power source module 1, a lighting circuit 2, a battery circuit 3, and an emergency switch circuit 4. The battery circuit 3 includes a charging indicator circuitry 32 for indicating the charging status of a battery and a battery module 31 for storing the electric energy and discharging the electric power when needed. Via the charging indicator circuitry 32, the power source module 1 is connected with the battery module 31 which its power output terminal is connected to the lighting circuit 2. And the power source module 1 is connected with the lighting circuit 2 via the emergency switch circuit 4. The power source module 1 is connected with the battery module 31 via the charging indicator circuitry 32, so that the charging indicator circuitry 32 indicates that charging is on going, when the power is supplied normally, since the charging indicator circuitry 32 is connected in series with the battery module 31, the indication light of the charging indicator circuitry 32 goes off to indicate that the emergency lighting is in a discharging status, when the utility power is interrupted or the switch test circuit 13 is pressed. In the case of the utility power being supplied normally, if the battery within the battery module 31 is in a disconnected status, the indication light of the indicating circuitry goes off to indicate that the emergency lighting is in a disconnected status, since the charging indicator circuitry 32 is connected in series with the battery module 31. The charging indicator circuitry 32 may be a simple lighting indicating circuitry, and there is no need for much improvement on the original circuit during manufacture and design, so that the charging indication function of the emergency lighting may be completed simply and quickly, and with only fewer components. Not only more functions of the emergency lighting are given but also the production cost is decreased and the economic efficiency is improved.

Further, the charging indicator circuitry 32 includes a light-emitting indicator unit 321 and a voltage-drop circuit 322 which allows the light-emitting indicator unit 321 to be lighted normally. The light-emitting indicator unit 321 is connected in parallel with the voltage-drop circuit 322, and is connected with the power source module 1 and the battery module 31. The light-emitting indicator unit 321 is used for indicating the charging status information and may be lighted for indication when the current flows through it, and the voltage-drop circuit is used for stabilizing the charging current in the charging circuit and also used for protecting the light-emitting indicator unit 321 from being burned by high voltage and giving fault information thereby.

Further, the light-emitting indicator unit 321 is a light-emitting diode. The positive electrode of the light-emitting diode is connected with the power source module 1, and the negative electrode of the light-emitting diode is connected with the battery module 31. It is the easiest optical signal indicating method to adopt the light-emitting diode in the light-emitting unit 21. By this method, the production costs can be extremely reduced, and the light-emitting diode consumes less power, has small size, can been installed easily, and is suitable for prolonged use of the emergency lighting.

Further, the forward voltage of the light-emitting diode is 1.8 Volts.

Further, the voltage-drop circuit 322 includes a first diode 3221, a second diode 3222, and a voltage-drop resistor 3223. The positive electrode of the first diode 3221 is connected with the power source module 1 and the light-emitting indicator unit 321, the positive electrode of the second diode 3222 is connected with the negative electrode of the first diode 3221, and the negative electrode of the second diode 3222 is connected with the positive electrode of the battery module 31 via the voltage-drop resistor 3223. The voltage-drop circuit 322 adopts the diodes and the voltage-drop resistor 3223. By this way, the simplest voltage-drop circuit 322 is constructed. Therefore, not only the cost can be reduced effectively, but also it has good operability and safety, consumes not much electric energy, and lets the design of the whole circuitry being suitable for environment protection and can be installed easily.

Further, the forward voltage of the first diode 3221 and the second diode 3222 are all 0.7 Volts. The total forward voltage of the two diodes is 1.4 Volts, which has a voltage difference to 1.8 volts of the light-emitting diode. The voltage difference is those across the two ends of the voltage-drop resistor, so that the battery module 31 may maintain an appropriate charging current by simply adjusting the value of the voltage-drop resistor.

Further, the lighting circuit 2 includes a plurality of light-emitting units 21 connected in parallel with each other. The positive electrode of the light-emitting unit 21 is connected with the positive electrode of the battery module 31, and the negative electrode of the light-emitting unit 21 is connected with the emergency switch circuit 4. The plurality of light-emitting units 21 connected in parallel is used for illumination when the utility power is interrupted. When the utility power is interrupted, the light-emitting unit 21 is lighted by the electric power provided by the battery module 31. Since the positive electrode of the light-emitting unit 21 is connected with the charging loop for the battery module 31, when the battery module 31 is charged, there are still some voltage on the positive electrode of the light-emitting unit 21, which can light the light-emitting unit 21. That is the reason why a normal charging circuit needs a comparator instead of being connected directly in series with the battery module 31. When the battery is disconnected, the charging indicator circuitry 32 can still be lighted by the light-emitting unit 21, so that it can not indicate the charging status of the battery correctly. In order to solve this problem, the power source module 1 is connected with the negative electrode of the light-emitting unit 21 via the intelligent emergency switch and provides a voltage which is the same with or higher than the positive electrode to the negative electrode of the light-emitting unit 21, and then the light-emitting unit 21 will not be conductive and lighted, so that the charging indicator circuitry 32 can work normally in different conditions.

Further, the emergency switch circuit 4 is connected with the ground, the power source module 1, and the negative electrode of the light-emitting unit 21 respectively. The intelligent emergency switch is connected with the ground and the power source module 1. When the utility power is supplied normally, the intelligent emergency switch outputs a voltage to the negative electrode of the light-emitting unit 21; after the utility power is interrupted or the switch test circuit 13 is pressed, the intelligent emergency circuit connects the negative electrode of the light-emitting unit 21 and the electric wires, and the electric energy of the battery module 31 is led to the ground through the light-emitting unit 21 and the intelligent emergency switch, thus the light-emitting unit 21 is lighted. By means of the way for controlling, lighting and extinguishing the light-emitting unit 21, not only a simpler design for the whole circuit can be obtained, but also any complex IC module is not needed, the cost is further reduced, the production is sped up, and the economic efficiency is raised.

Further, the power source module 1 includes a rectifier module 11 for rectifying the utility power and a voltage-stabilizing module 12 for stabilizing the output voltage. The current and voltage of the battery module 31 should be controlled properly so as to prevent the failures of the battery module 31 due to a large current. In order to keep the safety of the charging indicator circuitry 32 and the battery module 31, the charging indicator circuitry 32 is provided with the voltage-drop circuit, as well as the voltage at the joint point of the battery module 31 and the power source module 1 should be relatively stable, so the voltage may be stabilized within a range suitable for charging by the rectifier module 11 and the voltage-stabilizing module 12 within the power source module 1, thus providing a more effective protection for the charging indicator circuitry 32 and the battery module 31.

Further, the power source module 1 includes a switch test circuit 13 for simulating the interruption of the utility power, in which the switch test circuit 13 is connected with the power-supply output of the power source module 1 and the ground. The switch test circuit 13 is connected with the voltage output point of the voltage-stabilizing module 12 within the power source module 1 and the ground respectively. After the switch test circuit 13 is pressed, the voltage output point of the voltage-stabilizing module 12 is connected with the ground, thereby the power supply to the emergency switch circuit 4 and the battery circuit 3 is interrupted. In this way, the circuitry condition in the case of the interrupted utility power can be simulated in order to test if the emergency lighting can operate normally. Although the power source of the emergency lighting is generally hidden behind a wall surface or is disposed in a relatively remote place, the functions of the emergency lighting can be tested conveniently by providing the switch test circuit 13. Additionally, the elements of the charging indicator circuitry 32 can be examined for their appropriateness. In this way, the tests are running by means of connecting the output of the voltage-stabilizing module 12 to the ground. Comparing to normal switch test circuit 13, due to above-said design, the durability of the rectifier module 11 and the voltage-stabilizing module 12 can be extended. In other words, the interruption of the switch will not make the voltage of the rectifier module 11 and the voltage-stabilizing module 12 increase rapidly, which could damage the elements. This design has the advantages of being convenient, effective, and quickly-responsive.

Preferably, the switch test circuit 13 includes a triode, a switch button, and a high-value resistor. The emitting electrode of the triode is connected with the voltage-stabilizing output of the power source module 1 and the switch button. The other terminal of the switch button is connected with the base electrode of the triode and the high-value resistor, and one terminal of the high-value resistor is connected to the ground.

The lighting circuit 2 preferably comprises, in one implementation, 16 groups of light-emitting units 21 in parallel, in which each light-emitting unit 21 includes a resistor and a light-emitting diode. One terminal of the resistor is connected with the battery module 31, and the other terminal of the resistor is connected with the positive electrode of the light-emitting diode. By means of this arrangement, the strength of the light from the emergency lighting can be adjusted efficiently, so it has better flexibility.

Figure 4:
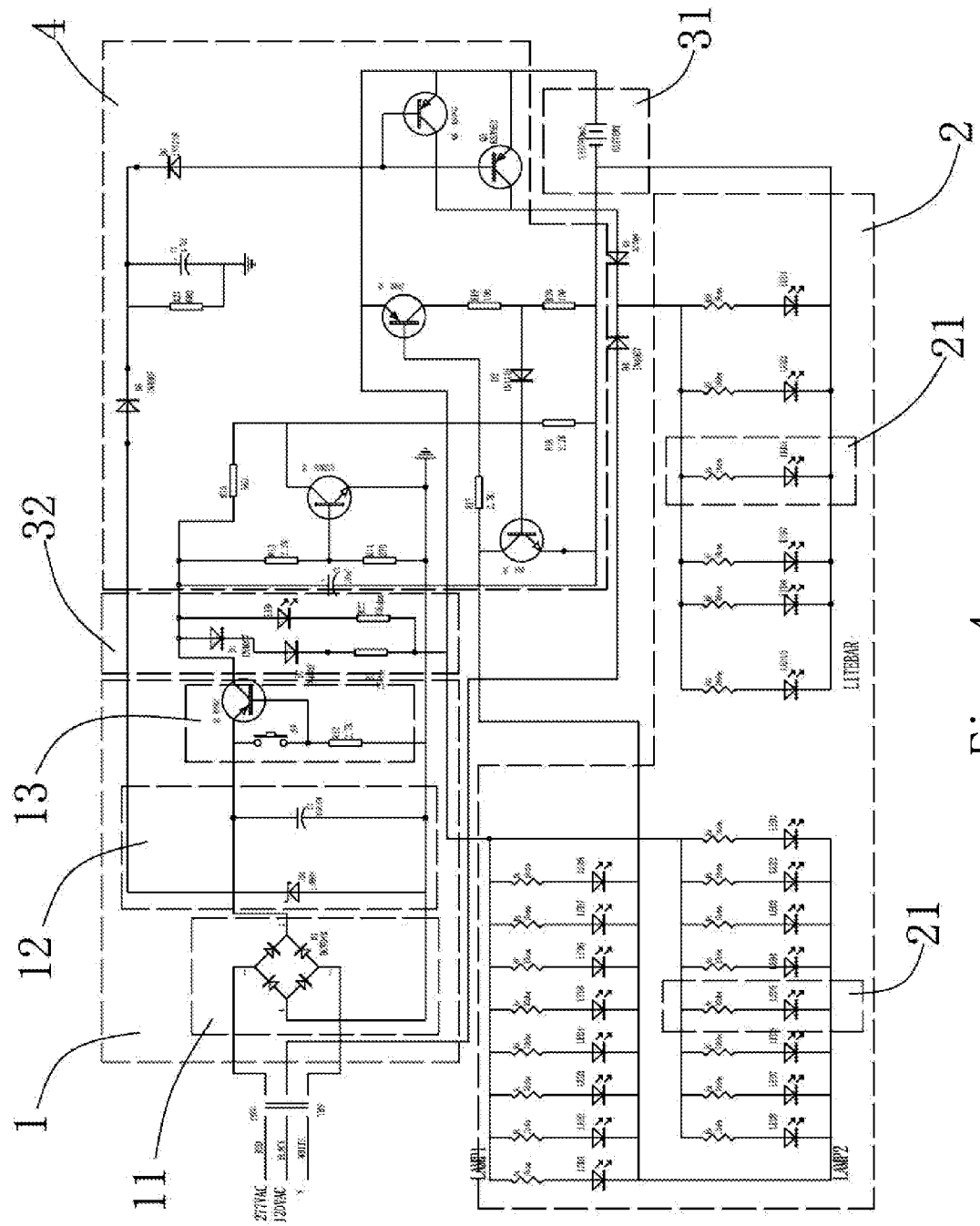
FIG. 4 is a schematic circuit diagram of the emergency lighting with a charging indicator circuitry according to the second embodiment of the invention.

Referring to FIG. 4, in another embodiment of the invention, the emergency lighting with a charging indicator circuitry has another kind of lighting circuit 2. The lighting circuit 2 includes the lighting module comprising 16 groups of light-emitting units 21 in parallel, as well as the utility power indicator module comprising 6 groups of light-emitting units 21 in parallel. The light-emitting unit 21 includes a resistor and a lighting-emitting diode. One terminal of the resistor is connected directly with the AC utility power to indicate the operation status of the utility power directly, so that the users may get more reference information about the operation of the emergency lighting by referring to the utility power indicator module and the charging indicator circuitry 32.

While this invention has been particularly shown and described with references to preferred embodiments thereof, it will be understood by those skilled in the art that various changes in form and details may be made therein without departing from the scope of the invention encompassed by the appended claims.

What is claimed is:

1. An emergency lighting with a charging indicator circuitry, comprising a power source module, a lighting circuit, a battery circuit for a battery, and an emergency switch circuit, wherein:

said battery circuit includes charging indicator circuitry for indicating the charging status of the battery, and a battery module for storing the electrical energy and discharging the electric energy when needed, said power source module is connected with the battery module via the charging indicator circuitry, a power supply terminal of the battery module is connected with the lighting circuit, and the power source module is connected with the lighting circuit via the emergency switch circuit, said power source module is connected with a negative electrode of a light-emitting unit via the emergency switch and provides a voltage which is same with or higher than a positive electrode to a negative electrode of the light-emitting unit, so that the charging indicator circuitry can perform normally in different conditions and the light-emitting unit will not be conductive and lighted when utility power is supplied normally, and wherein:

said charging indicator circuitry includes a light-emitting indicator unit, and a voltage-drop circuit which lets the light-emitting indicator unit be lighted normally;

said light-emitting indicator unit is connected in parallel with the voltage-drop circuit, and is connected with the power source module and the battery module.

2. An emergency lighting with the charging indicator circuitry according to claim 1, wherein:

said light-emitting indicator unit is a light-emitting diode;

the positive electrode of said light-emitting diode is connected with the power source module, and the negative electrode of said light-emitting diode is connected with the battery module.

3. An emergency lighting with a charging indicator circuitry according to claim 2, wherein:

the forward voltage of said light-emitting diode is 1.8 Volts.

4. An emergency lighting with the charging indicator circuitry according to claim 1, wherein:

said voltage-drop circuit includes a first diode, a second diode, and a voltage-drop resistor;

the positive electrode of the first diode is connected with the power source module and the light-emitting indicator unit, the positive electrode of the second diode is connected with the negative electrode of the first diode, and the negative electrode of the second diode is connected with the positive electrode of the battery module via the voltage-drop resistor.

5. An emergency lighting with a charging indicator circuitry according to claim 4, wherein:

said forward voltage of the first diode and the second diode are all 0.7 Volts.

6. An emergency lighting with a charging indicator circuitry according to claim 1, wherein:

said lighting circuit includes a plurality of light-emitting units connected in parallel with each other;

the positive electrode of said light-emitting unit is connected with the positive electrode of the battery module, and the negative electrode of said light-emitting unit is connected with the emergency switch circuit.

7. An emergency lighting with a charging indicator circuitry according to claim 6, wherein:

said emergency switch circuit is connected with the ground, the power source module, and the negative electrode of the light-emitting unit respectively.

8. An emergency lighting with a charging indicator circuitry according to claim 1, wherein:

said power source module includes a rectifier module for rectifying the utility power, and a voltage-stabilizing module for stabilizing the output voltage.

9. An emergency lighting with a charging indicator circuitry according to claim 1, wherein:

said power source module includes a switch test circuit for simulating the interruption of the utility power;

said switch test circuit is connected with the power supply output of the power source module and the ground.

* * * * *